US006768816B2

(12) United States Patent
Hall, Jr. et al.

(10) Patent No.: US 6,768,816 B2
(45) Date of Patent: Jul. 27, 2004

(54) METHOD AND SYSTEM FOR INTERACTIVE GROUND-TRUTHING OF DOCUMENT IMAGES

(75) Inventors: Floyd Steven Hall, Jr., Menlo Park, CA (US); Cameron Telfer Howie, Menlo Park, CA (US)

(73) Assignee: Convey Corporation, Menlo Park, CA (US)

( * ) Notice: Subject to any disclaimer, the term of this patent is extended or adjusted under 35 U.S.C. 154(b) by 0 days.

(21) Appl. No.: 10/171,333

(22) Filed: Jun. 13, 2002

(65) Prior Publication Data

US 2003/0152277 A1 Aug. 14, 2003

Related U.S. Application Data

(60) Provisional application No. 60/356,518, filed on Feb. 13, 2002.

(51) Int. Cl.[7] .......................... G06K 9/72; G10L 15/00
(52) U.S. Cl. ....................................... 382/229; 704/235
(58) Field of Search ................................ 382/173, 180, 382/177, 181, 203, 229, 309, 176, 305; 704/200, 275, 270.1, 235, 246, 260; 707/3, 6; 715/517, 530; 235/375

(56) References Cited

U.S. PATENT DOCUMENTS

| | | | |
|---|---|---|---|
| 5,555,556 A | | 9/1996 | Ozaki |
| 5,680,511 A | | 10/1997 | Baker et al. |
| 5,717,794 A | | 2/1998 | Koga et al. |
| 5,873,080 A | | 2/1999 | Coden et al. |
| 5,999,664 A | | 12/1999 | Mahoney et al. |
| 6,327,535 B1 | | 12/2001 | Evans et al. |
| 6,341,176 B1 | | 1/2002 | Shirasaki et al. |
| 6,438,539 B1 | * | 8/2002 | Korolev et al. ............. 707/3 |
| 6,463,433 B1 | * | 10/2002 | Baclawski ................. 707/5 |
| 6,470,334 B1 | * | 10/2002 | Umemoto .................. 707/3 |
| 6,556,970 B1 | * | 4/2003 | Sasaki et al. .............. 704/257 |
| 6,562,077 B2 | * | 5/2003 | Bobrow et al. ............. 715/517 |

OTHER PUBLICATIONS

Serge Belongie et al. "Matching Shapes" Department of Electrical Engineering and Computer Sciences University of California, Berkeley, CA IEEE 2001 consisting of 8 pages.

Venkatesh Ganti et al. "Clustering Large Datasets in Arbitrary Metric Spaces" Proceedings of the Fifteenth International Conference on Data Engineering (ICDE), Sydney, Australia 1999, consisting of 11 pages.

Jaakko Sauvola et al. "Page Segmentation and Classification Using Fast Feature Extraction and Connectivity Analysis" Proceedings of the 3th International Conference on Document Analysis and Recognition, Montreal, Canada, Aug. 1995, pp. 1127–1131.

(List continued on next page.)

*Primary Examiner*—Kanji Patel
(74) *Attorney, Agent, or Firm*—Mark A. Haynes; Haynes Beffel & Wolfeld LLP

(57) ABSTRACT

A method and a system by which a document image is analyzed for the purposes of establishing a searchable data structure characterizing ground-truthed contents of the document represented by the document image operates by segmenting a document image into a set of image objects, and linking the image objects with fields that store metadata. Image objects identified by segmenting the document image are grouped into subsets. The image objects are grouped according to characteristics suggesting that the image objects may have common ground-truthed metadata. By grouping the image objects into subsets, the image objects may be indexed to facilitate the ground-truthing process. In some embodiments, the index of representative image objects is presented to the user in a table form. A database of image objects with ground-truthed metadata is formed. Interactive tools and processes facilitate ground-truthing based on paired image objects and metadata.

138 Claims, 11 Drawing Sheets

OTHER PUBLICATIONS

Chang Ha Lee et al. "The Architecture of TRUEVIZ: A GroundTRUth/metadata Editing and VIsualiZing Toolkit" Language and Media Processing Laboratory Center for Automation Research University of Maryland, Feb. 2001 consisting of 23 pages.

Oleg Okun et al. "Page Segmentation and Zone Classification: The State of the Art" Machine Vision and Media Processing Unit, Infotech Oulu and Dept. of EE, Oulu, Finland, Language and Media Processing Laboratory, University of Maryland Nov. 1999 consisting of 37 pages.

David Doermann "The Indexing and Retrieval of Document Images: A Survey" Language and Media Processing Laboratory Center for Automation Research, University of Maryland, Feb. 1998 consisting of 38 pages.

Doe–Wan Kim et al. "A Point Matching Algorithm for Automatic Groundtruth Generation" Language and Media Processing Laboratory, Center for Automation Research, University of Maryland Feb. 2001 consisting of 36 pages.

* cited by examiner

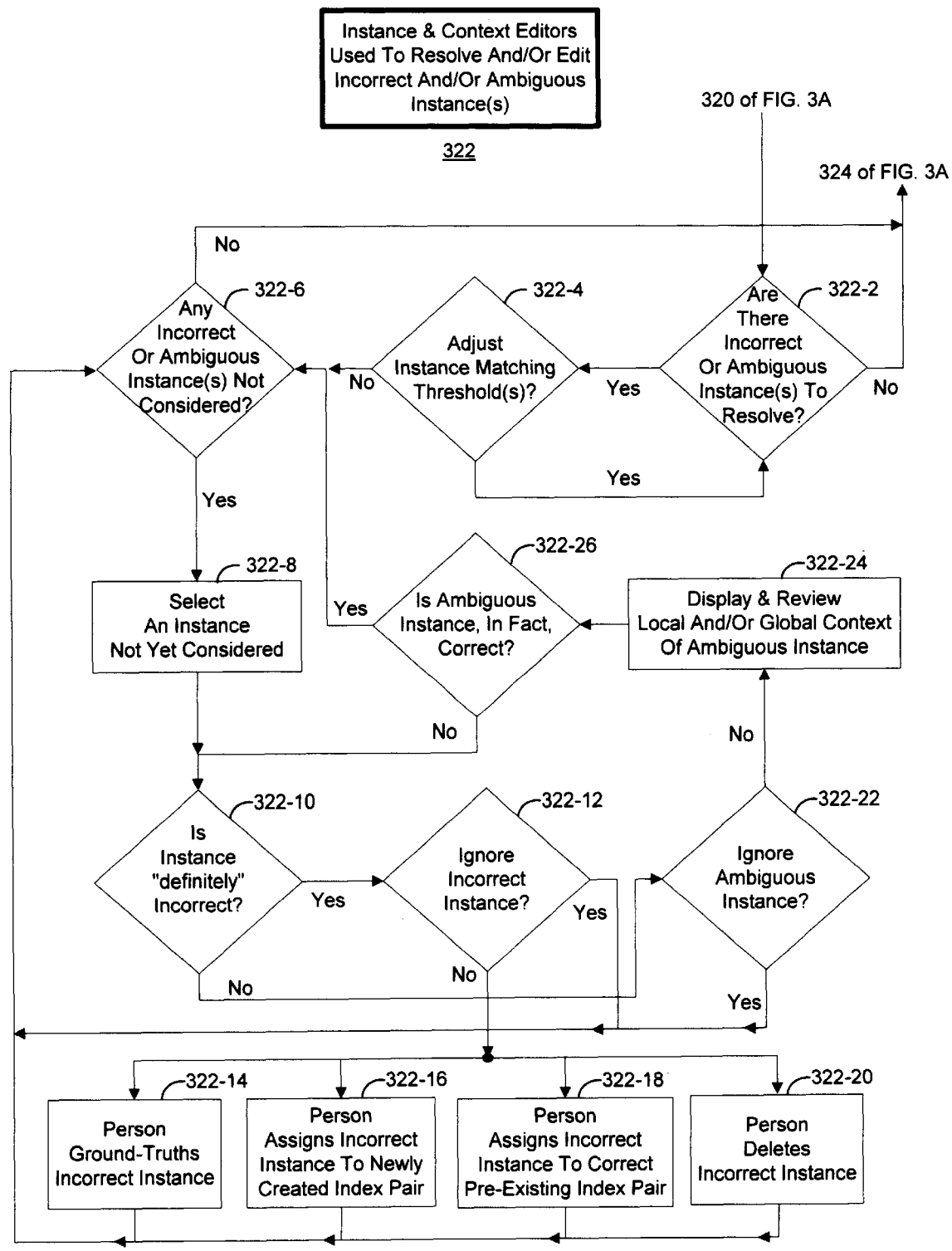

METHOD AND SYSTEM FOR INTERACTIVE GROUND-TRUTHING OF DOCUMENT IMAGES

RELATED APPLICATION DATA

This application claims the benefit of U.S. Provisional Application No. 60/356,518, filed Feb. 13, 2002.

BACKGROUND OF THE INVENTION

1. Field of the Invention

The present invention relates to document image analysis, and to text and object recognition techniques for the purpose of creating searchable files from document images. More particularly, the present invention relates to providing more efficient tools and techniques for human based ground-truthing of the searchable files.

2. Description of Related Art

The longtime goal of vendors of text recognition technologies is to create 100% accurate computer searchable files, totally automatically, from a wide range of document images. However, after decades of trying, it has become increasingly apparent that this goal of automation may never be achieved. See, David Doermann, The indexing and retrieval of document images: A survey. Technical Report CS-TR-3876, University of Maryland, Computer Science Department, February, 1998.

So, to compensate for the limited automation of these technologies, human assistance is required. Specifically, text recognition technologies, which include, but are not limited to, Optical Character Recognition (OCR) & Intelligent Character Recognition (ICR), require human assistance, referred to as ground-truthing, that involves human proofreading of the textual output, human comparison of this textual output with the original image text, and human correction of textual recognition errors. See, Doe-Wan Kim, and Tapas Kanungo. *A Point Matching Algorithm for Autmomatic Groundtruth Generation*. Technical Report: LAMP-TR-064/CS-TR-4217/CAR-TR-961/MDA-9049-6C-1250, University of Maryland, College Park, 2001; R. A. Wilkinson, M. D. Garris, J. C. Geist. *Machine-Assisted Human Classification of Segmented Characters for OCR Testing and Training*, Technical Report NISTIR 5105 [102K], December, 1992 and In D. P. D'Amato, editor, volume 1906. SPIE, San Jose, Calif., 1993; and Chang Ha Lee, and Tapas Kanungo. *The Architecture of TRUEVIZ: A groundTRUth/metadata Editing and VIsualiZing toolkit*. Technical Report: LAMP-TR-062/CS-TR-4212/CAR-TR-959/MDA-9049-6C-1250, University of Maryland, College Park, 2001.

For mainstream businesses and government agencies, that wish to post mountains of scanned documents to public Web sites and corporate Intranets, this line-by-line checking for, and correction of, recognition errors is impractical. And since these mainstream organizations require 100% accuracy, to ensure that their document images can be reliably retrieved, they have rejected these text recognition products entirely.

Nonetheless, with or without text recognition products, mainstream organizations do realize that a significant amount of human interaction is required in order to guarantee 100% retrieval. So, what these organizations are seeking, is a way to make this time-consuming manual process far more efficient.

Thus, with this goal in mind, the present invention was created.

SUMMARY OF THE INVENTION

The present invention provides a method and a system by which a document image is analyzed for the purposes of establishing a searchable data structure characterizing ground-truthed contents of the document represented by the document image, and in some embodiments including resources for reconstructing an image of the document. According to the present invention, the document image is segmented into a set of image objects, and the image objects are linked with fields that store metadata.

Image objects are specified regions of a document image that may contain a structural element, where examples of structural elements include, but are not limited to, a single word, a title, an author section, a heading, a paragraph, a page, an equation, a signature, a picture, a bar-code, a border, a halftone image, noise, and the entire document image. The image objects into which the document image is segmented may or may not be exclusive, where exclusive image objects do not overlap with other image objects. In embodiments in which the document image consists of a bitmap, image objects may consist of portions of the bitmap that include a shape or shapes including black or colored pixels that are separated from other black or colored pixels by clear regions having specified characteristics.

The image objects are identified and linked with fields for storing metadata. The metadata is used to bind logical structure, and thus meaning, to image objects in the document image. Thus examples of metadata include, but are not limited to, indications, pointers, tags, flags, and plain text represented in computer readable code, such as ASCII, EBCDIC, Unicode, and the like. Image objects linked with metadata fields storing ground-truthed metadata can be organized into searchable records, such as hierarchically organized documents. Thus, the data structure including image objects and linked metadata can be independently searched, retrieved, stored, managed, viewed, highlighted, shared, printed, protected, indexed, edited, extracted, redacted, toggled (between image view and metadata view) and the like.

In the present invention, an interactive framework is presented for efficiently ground-truthing document images via image objects paired with fields for ground-truthed metadata (called herein "image object pairs"). Here, ground-truthing an image object pair is accomplished by ground-truthing its metadata. More specifically, in one embodiment of the invention, in order to "ground-truth" an image object pair, the following two computer assisted steps are available:

1. Initial metadata is input into an image object pair by either (a) manually creating it, (b) automatically creating it (such as with text recognition, etc.), or (c) importing it.
2. Manually verify the accuracy of this initial metadata, or manually correcting this initial metadata.

Embodiments of the present invention increase the efficiency of human ground-truthing by using an index of unique image object pairs. This image object pairs index can eliminate the time and expense of ground-truthing each instance of each unique image object pair one-by-one, as required by text recognition products. Moreover, this index increases the efficiency of human ground-truthing even more as (1) the number of instances associated with any unique image object pair increases, and as (2) the accuracy of the segmentation process increases. Indeed, since the efficiency of human ground-truthing is so strongly influenced by the accuracy of segmentation, the present invention allows for human control over the segmentation process.

Also, the efficiency of human ground-truthing is strongly influenced by the quality of the document images being processed as well. Specifically, poor quality document images that have a lot of ambiguous content, such as those created from faxed, aged, photocopied, and faded paper originals, may reduce tremendously the effectiveness of an image object pairs index, and thus, the efficiency of human ground-truthing. As a result, the present invention also describes a method for ground-truthing image object pairs without using an image object pairs index. Indeed, this method is also useful for ground-truthing document images that contain a substantial amount of handwritten or hand-printed content as well.

Moreover, it should be pointed out that an image object pairs index is also extremely useful even when no ground-truthing occurs. For example, in one embodiment of the invention, an image object pairs index can be used to efficiently retrieve some, or all, of the instances of any unique image object pair contained within the index, when the metadata within each image object pair is NULL.

In one aspect of the invention, a method for analyzing a document image is provided which comprises segmenting the document image to identify a set of image objects within the document image, and processing the set to group image objects within the set into a plurality of subsets, where the subsets may include one or more members. In this aspect, reference image objects are linked to corresponding subsets in a plurality of subsets. Machine-readable data structures are created including the reference image objects with linked metadata fields, whereby image objects in the corresponding subsets are linked to common metadata in the linked metadata fields. The method includes presenting the reference image objects to the user, and accepting input from one or more users, to interactively populate the linked metadata fields with ground-truthed metadata, by inserting, deleting, editing and/or validating text, flags or other data about the image object in the linked fields. In some embodiments, the method further includes generating a searchable data structure to represent the document image, where the searchable data structure comprises the metadata linked to the set of image objects, and the set of image objects.

In some embodiments, the process of segmenting the document image includes presenting at least a portion of the document image with graphical constructs showing boundaries of the identified image objects in the set to the user, and accepting input from the user to interactively adjust the boundaries to form a new set of identified image objects. Also, the segmenting includes an automated process that identifies separate objects according to segmentation parameters. The user may adjust the segmentation parameters interactively to optimize the automated segmentation for a given document image.

Image objects identified by segmenting the document image are grouped into subsets in some embodiments, which facilitates ground-truthing. According to one approach, the image objects are grouped according to characteristics suggesting that the image objects may have common ground-truthed metadata. For example, image objects are grouped in some embodiments so that image objects in a particular subset consist of image objects having similar shapes. In some embodiments, the grouping process is executed with an adjustable parameter by which similarity among image objects of a subset is adjustable. For example, a threshold for a number of different pixels in the image objects within a subset may be adjusted in order to change the grouping of image objects.

By grouping the image objects into subsets, the image objects may be indexed to facilitate the ground-truthing process. In some embodiments, the index of representative image objects is presented to the user in a table form. The table includes a set of entries that correspond to respective subsets of image objects within the set of image objects. Entries include the representative image objects for the respective subsets and fields for ground-truthed metadata. In the presentation of the table, the representative image objects are ordered according to similarity in shape, similarity in metadata, characteristics derived from the document image, such as position in the document image, or the like. Tools are provided to the user for interactively removing an image object, or group of image objects, from a selected subset, or moving image objects from one subset to another, and otherwise managing the grouping and indexing of image objects from the document image.

Representative image objects for the purposes of this indexing structure, may be selected from the subset of image objects, or may be composed from a combination of more than one image objects from within the subset, from sets of icons, or from other sources.

According to yet another aspect of the invention, the method includes segmenting the document image to identify a set of image objects, and creating machine-readable data structures pairing identified image objects in the set with the linked metadata fields. In this aspect of the invention, representations of the identified image objects are presented to the user, and audio input is accepted and translated using speech recognition tools, to interactively populate the linked metadata fields with ground-truthed metadata. In some embodiments according to this aspect of the invention, the image objects are presented to the user for ground-truthing in a reading order for the document image. Alternatively, representative image objects are presented to the user in an index grouping similar image objects, as discussed above.

The present invention may be applied in combination with other techniques for ground-truthing, and for facilitating the processing of document images. Thus, in one embodiment of the invention a method for analyzing a document comprises segmenting the document image to identify a set of image objects, applying text recognition tools to produce proposed text for the set of image objects, and processing the set to group image objects within the set into a plurality of subsets as discussed above. Linked metadata fields for the image objects are populated with proposed metadata based on the text recognition process. The identified image objects, using reference image objects in some embodiments, are presented to the user, and input is accepted from the user to interactively populate the linked metadata fields with ground-truthed metadata fields. Thus, the proposed text provided by text recognition tools, such as optical character recognition, word recognition and the like, is presented to the user along with the representation of the image objects.

In various embodiments, the text recognition processing is applied to the entire document image or portions of the document image to facilitate contextual processing. In other embodiments, the text recognition processing is applied to the segmented image objects, or representative image objects, individually. Some embodiments may provide resources for performing text recognition at any point in the processing of the document image.

The present invention also includes a process by which analysis of documents can be leveraged among similar documents, by creating a library of representative image objects with linked metadata fields that can be applied in the analysis of new documents. Thus, in one aspect of the invention the process includes providing a database of representative image objects with linked metadata fields storing metadata. The document image is segmented to identify a set of image objects within the document image. The set of image objects is processed to match image objects in the set with representative image objects in the database, and to link the matching image objects in the set with particular representative image objects in the database. The image objects from the document image can be ground-truthed by presenting instances of image objects in the set that are linked with particular representative image object in the database, and by accepting user input to interactively undo the link of the selected image objects with particular representative image object, to populate metadata fields of image objects that have not been linked to representative image objects in the database, and move image objects that have been mistakenly associated with a particular representative image object in the database so that it becomes associated with another representative image object in the database.

The present invention is also embodied by an apparatus that comprises a data processing system having a user input device, a display, memory or access to a memory storing the document image, and processing resources to perform the functions outlined above. In some embodiments, the data processing system is also linked via a communication medium to workstations at which a plurality of users may interactively work in the ground-truthing process.

Other aspects and advantages of the present invention can be seen on review of the drawings, the detailed description and the claims, which follow.

BRIEF DESCRIPTION OF THE DRAWINGS

FIGS. 3A and 3B graphically depict the detailed steps used in one embodiment of the invention to ground-truth document images in accord with an embodiment of the present invention.

DETAILED DESCRIPTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the invention. Thus, the present invention is not intended to be limited to the embodiments disclosed, but is to be accorded the widest scope consistent with the principles and features disclosed herein.

Figure 1:
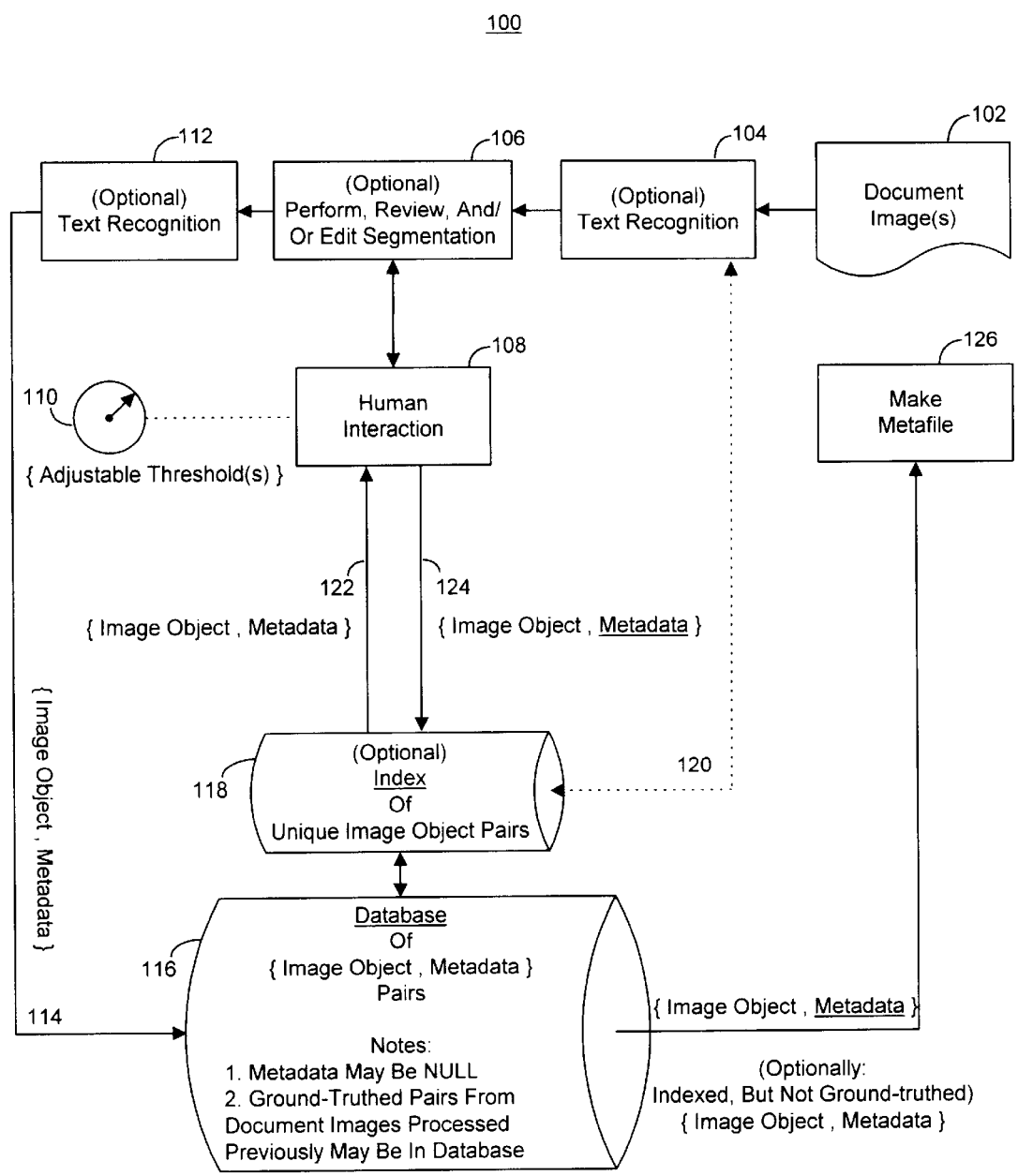
FIG. 1 is a diagram illustrating the interactive framework used in one embodiment of the invention to ground-truth document images in accord with an embodiment of the present invention.

FIG. 1 is a diagram illustrating an interactive framework 100 in accordance with an embodiment of the present invention. Said framework receives as input a document image 102. In one aspect of the present invention, said image comprises a machine readable file including a bit mapped representation of a document. In another aspect of the invention, said image comprises a plurality of machine readable files including respective bit mapped representations documents. In yet another aspect of the invention, the document image is viewed and ground-truthed on a computer desktop display device.

A resource within the framework segments the document image to identify a set of image objects. Examples of image objects are textual characters, textual words, lines of text, drawings, logos, photographs, and noise artifacts (speckles, smudge marks, punch holes, etc.).

In one aspect of the present invention, the segmentation resource 106 includes an automatic algorithm. For examples of such algorithms see L. O'Gorman, *The document spectrum for page layout analysis*, IEEE Transactions on Pattern Analysis and Machine Intelligence, 15:1162–1173, 1993; and U.S. Pat. No. 5,555,556.

Automatic segmentation algorithms are also typically incorporated within an optional text recognition resource 104 and may be used to pre-process the document image prior to recognition. For example, the Adobe® Acrobat® Capture® Optical Character Recognition (OCR) application performs automatic page segmentation prior to carrying out text recognition on image objects that are characters. Text recognition accuracy can be improved by using contextual information among image objects e.g., U.S. Pat. No. 5,680,511.

In another aspect of the invention, segmentation is done, or adjusted, manually by a user through an interface 108. At least a portion of the document image is presented to the user who then identifies and adjusts image objects boundaries interactively e.g., with the use of a computer 'mouse' device. Graphical feedback is provided to the user by displaying image object boundaries relative to the document image using constructs such as color highlighting or polygonal bounding boxes. The user interface includes support for removing an object from the set of image objects. For example, noise artifacts in document image might have been segmented and need removal.

In yet another aspect of the invention, segmentation is performed both automatically and manually, possibly iteratively to the user's satisfaction. Therefore interface 108 includes an adjustable threshold 110 for controlling one or more algorithmic parameters of the automatic segmentation resource. Following adjustment of one of said parameters, said segmentation resource may be used to re-segment one or more specified image objects. The use of such interactive thresholding greatly reduces the amount of human interaction required to review and finalize segmentation results for each object boundary.

Adjustable threshold 110 includes in some embodiments, a user interface control device for alteration of a numerical parameter used by an algorithm in framework 100. An example of a user interface control device is a graphical presentation of a rotational knob on a computer display screen, said knob being controlled by the user with a computer mouse device. An example parameter that could be controlled by an adjustable threshold is one used to control image object segmentation by specifying a minimum required separating space, measured in pixels, between two image objects for said separation space to be classified as a 'word' space. In another example, the threshold may set the maximum permitted number of 'difference pixels' for comparison of two image objects using bitmap XOR wherein said comparison is classified as a 'mismatch' if the number of pixels that differ in said comparison exceeds said permitted number. In yet another example, a parameter controls the color used to display image objects belonging to a class e.g., word objects, by using an integral value to select a color from a color palette presented to the user.

According to another aspect of the present invention, a document template is used to provide correlation of image object boundaries with those in said template, thereby enabling automatic segmentation of objects within the image. For example, forms and other documents with specific layouts support the use of templates. The template includes specification of expected image object boundaries. Said expected boundaries are used by the automatic segmentation algorithm as a guide in determining the actual boundaries of objects present in the image.

Machine readable data structures are created to pair identified image objects with linked metadata fields 114. Examples of metadata are plain text dictionary words, hyperlinks to another resource or image object, information describing the layout of the image object in the document image, and raw binary data encoding content specific to an application. Valid metadata includes a 'null' value as well as data spanning multiple languages. Furthermore, metadata may include searchable characteristics of the image objects. This enables the construction of a computer readable metafile 126 that supports searchable operations on the document image e.g., U.S. Pat. No. 6,275,610.

According to one aspect of the invention, metadata fields are populated using output proposed by a text recognition resource 104. As text recognition methods perform better on correctly segmented images, a second such resource 112, following segmentation review by the user, may be used as an alternative to 104 or in addition to it. This may improve the accuracy of said proposed metadata, particular in noisy document images.

In yet another aspect of the invention, image objects are presented to the user for interactive specification of metadata. User interface 108 therefore includes those operations necessary to insert, delete, and edit image objects and their linked metadata fields. For example, if the image object is a word, the user can type in the ground-truth plain text characters of said word using a keypad device. In another example, if the image object is a photograph the user can provide metadata describing its content. Descriptions and text are provided by a voice input device and translated to computer readable plain text by a speech recognition resource, in one embodiment. User-supplied metadata may be provided during a manual segmentation process described above i.e. the processes of segmentation review and metadata specification may run concurrently.

Linked object-metadata pairs are stored in a database 116. In one aspect of the present invention, said database is held in a volatile storage medium e.g., a computer random access memory (RAM) chip. In one aspect of the invention, said database is stored using a persistent medium e.g., a computer hard disk. In another aspect of the invention, said database supports concurrent access by multiple users groundtruthing one or more document images. In yet another aspect of the invention, the database comprises object-metadata pairs from multiple document images.

In accordance with another aspect of the invention, the metadata fields are populated by matching image objects with those in the database 116 and, for any matches found, using the corresponding metadata from the database. An example of such a matching process would be comparison of bitmapped document image objects with those in the database using the Boolean XOR operator (an operator common in the art). Where any such matches are performed incorrectly, the user can interactively edit the metadata and adjust any links between image objects and their metadata fields. Moreover, adjustable thresholds 110 can be used by the user to control the matching accuracy. If said accuracy is too fine, little database content may be leveraged; however, if it is too coarse then many false matches may result.

Ordering and linking of image objects provide useful contextual data structures for the purposes of entering and searching metadata. Therefore image objects within the identified set may be ordered e.g., into a reading order, and linked to one another e.g., hyphenated words may comprise more than one image object that can then be linked. Specification of order and links among objects may be done, for example, through an input device such as a computer mouse or by following the user's point of visual focus on the document image display using an eye tracking device. In one aspect of the present invention, objects linked into a reading order are ground-truthed using continuous speech recognition input whereby the speech pattern is broken down into metadata tokens that correspond to the sequence of image objects in said order. In another aspect of the invention, wordspotting is used as an aid in ground-truthing objects within some specified document image context. For example, speech recognition is used to provide a metadata plain text. Said text is converted to raster form using one or more font resources and a rendering device (e.g., printer driver) into one or more raster images. Said raster images are matched against said context. Those objects within said context sufficiently similar to said raster images are then assigned said recognized metadata.

For efficiency purposes, an index structure can be used to exploit redundancy in the document image, thereby reducing human interactive effort enormously. Therefore, in another embodiment of the present invention, an index 118 is constructed from objects within the database. Said index is constructed by a process that groups identified image objects into a plurality of subsets, the subsets including one or more image objects. In one aspect of the invention, an empty set is also permitted.

For example, subsets may be constructed as clusters wherein image objects have similar shape, or similar metadata. There are many clustering algorithms in the art e.g., a vector quantizer; see for example, Linde, Y., Buzo, A., Gray, R., *An Algorithm for Vector Quantizer Design*, IEEE Transactions on Communications, 28(1) pp. 84–94, January 1980. Similarity among image objects can be measured using common techniques like bitmap XOR. Furthermore, size normalization can be used to overcome differences in object scale as might occur, for example, with the same word in a document image appearing numerous times but at different font sizes.

In one aspect of the invention, a representative object is assigned to each subset and machine readable data structures are created to link metadata fields to said representative object. In another aspect of the invention, said linked metadata includes the image objects within the subset as well as their associated metadata. Examples of representative objects are an image object from the subset, an image object from the global set of identified image objects, image objects rendered from plain text using a printer driver, and an image object created from two or more image objects (e.g., a 'centroid' image). Image objects within a subset are considered to be 'instances' of the representative object.

User interface 108 supports operations that include those necessary to insert, delete, and edit image object subsets. In particular, clustering is controlled via a user adjustable threshold 110, and image objects can be removed from a subset as well as moved to another subset.

For ground-truthing purposes, representative objects and image objects within the corresponding subset are presented to the user. Input devices such as a keypad or audio input system with speech recognition enable the user to provide metadata for the objects thus presented. In one aspect of the invention, the user provides metadata for a displayed representative object, thereby populating the metadata fields of the linked image objects in the subset. In another aspect, the user provides metadata for one or more objects in a subset directly without affecting the common metadata fields linked to the representative objects.

As with non-index based ground-truthing, a text recognition resource may be used to propose common metadata for a subset as well as metadata for image objects within a subset. Therefore in one aspect of the present invention, text recognition 120 is used to populate metadata fields in a subset by performing recognition on the representative object. In another aspect of the invention, recognition is performed on the objects in the subset and a voting scheme is employed to assign common metadata to the representative object. In accordance with yet another aspect of the invention, said common metadata is used to populate the metadata fields of one or more image objects within the subset. For example, an adjustable threshold 110 could be used to determine which of said objects inherit the common metadata according to some similarity metric.

Figure 2:
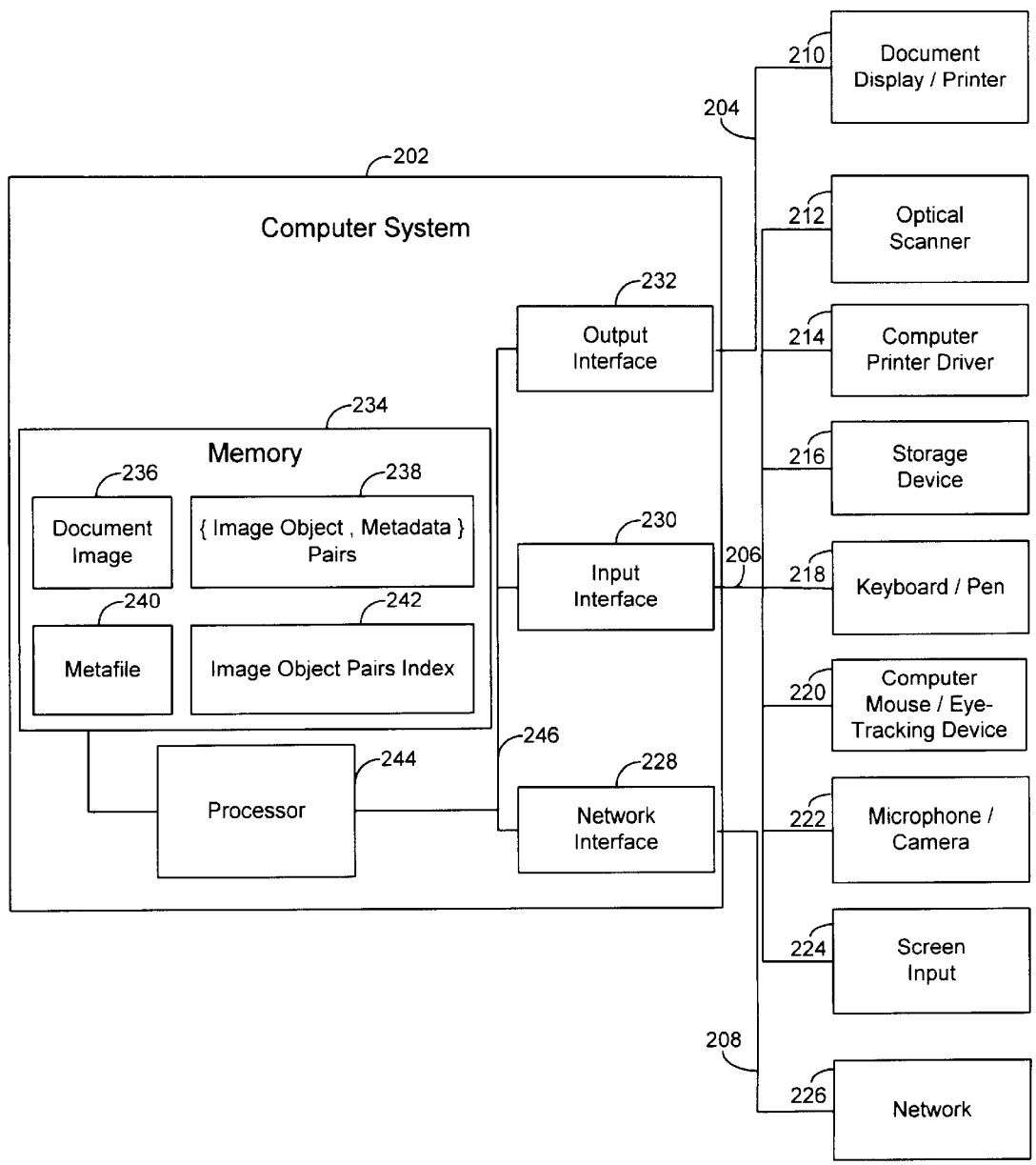
FIG. 2 is a diagram illustrating an embodiment of the present invention depicting a computer system, which has a variety of input and output devices, and a network connection.

FIG. 2 depicts a computer system 202 sufficient to enable implementation of framework 100 in accordance with one embodiment of the present invention. Said system is connected through cable 204 to one or more output devices, connected through cable 206 to one or more input devices, and connected through cable 208 to a computer network 226. Display and printer device 210 is used to render bitmapped document images. Optical scanner 212 captures physical (especially paper) documents into bitmap raster form. Printer driver 214 renders electronic metadata in raster bitmap form. Therefore devices 212 and 214 enable ground-truthing of both paper and electronic documents by way of bitmapped images. Storage device 216 provides a stable medium, in particular for database 116. Keyboard and pen input devices 218 are used for nonverbal input of metadata. Computer mouse and eye-tracking device 220 enable contextual interaction with the user. A microphone and camera 222 are used for advanced input—verbal input from the user is captured by the microphone, and the camera may be used to track user input for enhanced accuracy (e.g., the use of lip-reading software integrated with a speech recognition resource). The screen input 224 includes a touch-sensitive interface.

Computer system 202 is typical of a present day personal computer (PC) and includes a network interface 228, input interface 230, output interface 232, computer memory 234, a representation of one or more document images 236, a representation of image object-metadata pairs 238, a representation of a metafile 240, and a representation of an index 242 for object-metadata pairs. In addition, computer system 202 contains processor 244 which is any type of processor such as a microprocessor, dedicated logic, a digital signal processor, a programmable gate array, a neural network, or a combination of processors, as well as a data bus 246 and other supporting structure known in the art.

Figure 3A:
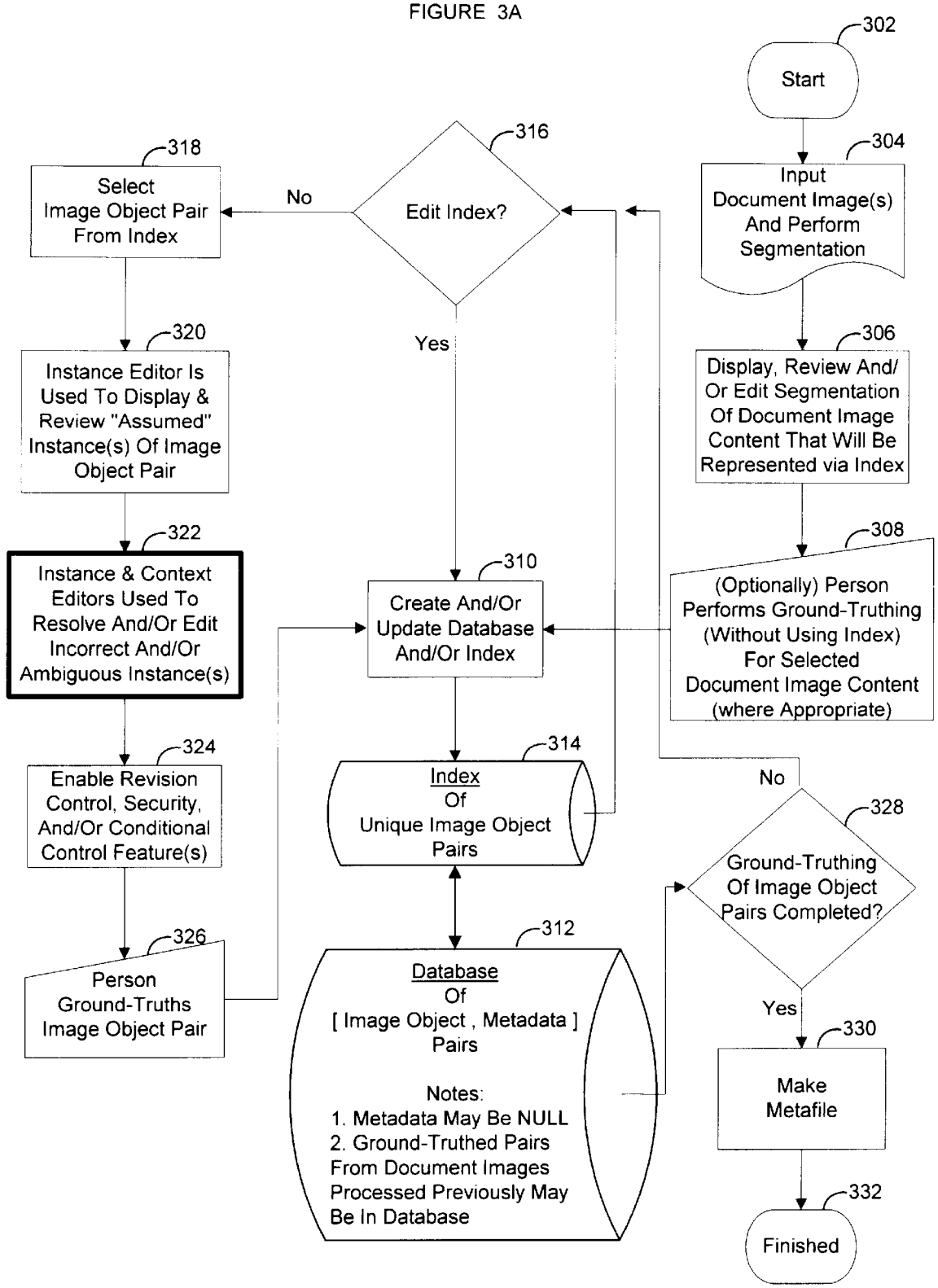

FIGS. 3A and 3B graphically depict an embodiment of the present invention, as described above, in greater detail.

The ground-truthing process starts 302 with the input of the document image 304. Typically, document images will be created either by scanning paper documents, or by using a computer printer driver to rasterize electronic documents (e.g., PC-based facsimile software). A segmentation editor 306 with graphical user interface (GUI) implements segmentation resource 106. The user 308 has the option to ground-truth image objects without the use of index structure 118. For example, hand-written and degraded textual content may segment into image objects such that no matching with other objects in the document image is possible i.e., such objects appear to be unique by shape or other feature metrics. Such objects are typically easier to ground-truth in context in the document image, rather than within a subset in the index. This is demonstrated later in FIG. 9. Of course, the user has discretion in determining whether or not to include image objects of hand-written features in the index. In larger image object sets, matching of hand written features may be achieved, using an image matching algorithm tailored to hand-written features, such as described in S. Belongie, J. Malik, and J. Puzicha. *Matching shapes.* The Eighth IEEE International Conference on Computer Vision (ICCV), Volume 1, pages 454–461, Vancouver, Canada, Jul. 9-12, 2001. Thus, in such an implementation, ground-truthing hand-written and hand-printed text is more efficient via an index.

Component 310 is used to manage database 312. In one aspect of the present invention, metadata describing words in various typesetting fonts is passed through a printer driver 214 to produce image objects for said words. Said metadata is then linked with said image objects and stored in the database. In yet another aspect of the invention, the database comprises object-metadata pairs from previous ground-truthing sessions. This creates a useful persistent resource in which pairs accumulate as more image objects and document images are processed, thereby increasing the likelihood of matching document image objects against those already in the database.

Index 314 is constructed for database 312 as described above. Index editor 316 provides a GUI for user review and editing of index entries. Image object-metadata pair 318 is a subset within the index. Therefore pair 318 enables access to not only the representative object for the subset but also the subset elements (the object 'instances'). Input to editor 320 is an index entry in which all object instances are assumed to be listed under the representative object correctly. However, clustering errors during index construction can result in image objects appearing in the wrong subset. User interaction tools are therefore provided to adjust subset composition so as to create 'approved' image object subsets. Instance editor 320 hence includes component 322 for interactive review and editing of index subsets. Said component is now explained in greater detail:

Component 322-2 displays to the user those image objects in subset 318. Said display may include incorrect and ambiguous image object instances. An incorrect instance may occur, for example, due to an inappropriate threshold 110 used during index construction, or due to an image object having an incorrectly segmented boundary. An example cause of ambiguous instances would be photocopy degradation of textual features such that an instance of the word "these" appears very similar to an instance of the word "those"—correct assignment of such objects to subsets is done through the aid of an interactive context editor.

A context editor displays at least a portion of the document image including a specified image object of interest. This presents the object context to the user, thereby enabling unambiguous identification of the image object. If said object should not be grouped in subset 318 it can be edited as appropriate. For example, it may need its boundary adjusted, possibly effecting other image objects e.g., said object might be a segmented fragment "TION" of the word "ADMINISTRATION". A neighboring object might then be the first portion of the word object: "ADMINSTRA". Consequently, adjustment of the former object boundary should include adjustment of the latter so as to form a new single object for the entire word. Other possible editing operations on an object include moving the object to another subset in the index, and removal of the object from the index entirely e.g., if it's not worth ground-truthing because it's a noise artifact.

Multiple image object assignments to index subsets may be controlled through the use of adjustable threshold 322-4. Said threshold is controlled by the user through the GUI e.g., by way of a rotational dial control. Changes in the threshold may result in image objects being removed from the subset as they are no longer sufficiently similar to the other instances in the subset. Said removed objects may then be assigned to other index subsets as directed by the user via features of the GUI or by automatic mapping of objects to subsets per the index construction algorithm. A threshold therefore provides a convenient single point of control that allows for movement of multiple image objects from one subset to another.

Supporting components 322-8, 322-10, 322-12, 322-22, 322-24, 322-26 implement a control logic for iterative interaction with the user for the purposes of index subset review and editing. In particular, various options are included for addressing image objects that appear in a subset incorrectly. The user may supply immediate ground-truth metadata 322-14 to an image object. Said object may then be placed in the appropriate location of database 312 e.g., by removing it from subset 318 and inserting it into an appropriate entry of the database according to said metadata. The user may also create a new index entry for an object via 322-16 or move the object to an appropriate existing index entry 322-18. Alternatively, an object may also be deleted from the index using 322-20. In one aspect of the present invention, the user may identify multiple image objects as being incorrectly listed in subset 318. Said multiple objects may then be handled collectively as a group, thereby reducing the effort required to edit the subset to an approved state.

Component 324 is provided for advanced control of index subsets. Revision control includes support for locking index subsets such that changes to said subsets are not permitted. This is important for applications where image objects are moved in large groups, especially automatically, such that they may be inserted into subsets already reviewed and approved by the user, possibly contaminating said subsets with newly injected incorrect instances. Security control includes access rights to the database where multiple users are ground-truthing index subsets concurrently. As with traditional multi-user computing systems, sufficient measures must be taken to ensure access to data structures is in accordance with the security permissions as defined for computer system 202. For example, modern operating systems such as Microsoft® Windows NT® include features for 'locking' data structures and other system resources, as well as specification of explicit 'read' and 'write' control of data. Conditional control includes a mechanism to permit the user to flag image objects such that operations on said objects are handled in accordance with rules as specified by the implementation. For example, objects might be flagged for exclusion from the index altogether (e.g., because the user ground-truthed their metadata during page segmentation review), or flagged as being 'textual' so that automatic text recognition can be used to propose metadata for said objects.

FIGS. 4–8 further illustrate an example of an implementation of one embodiment of the present invention.

Figure 4:
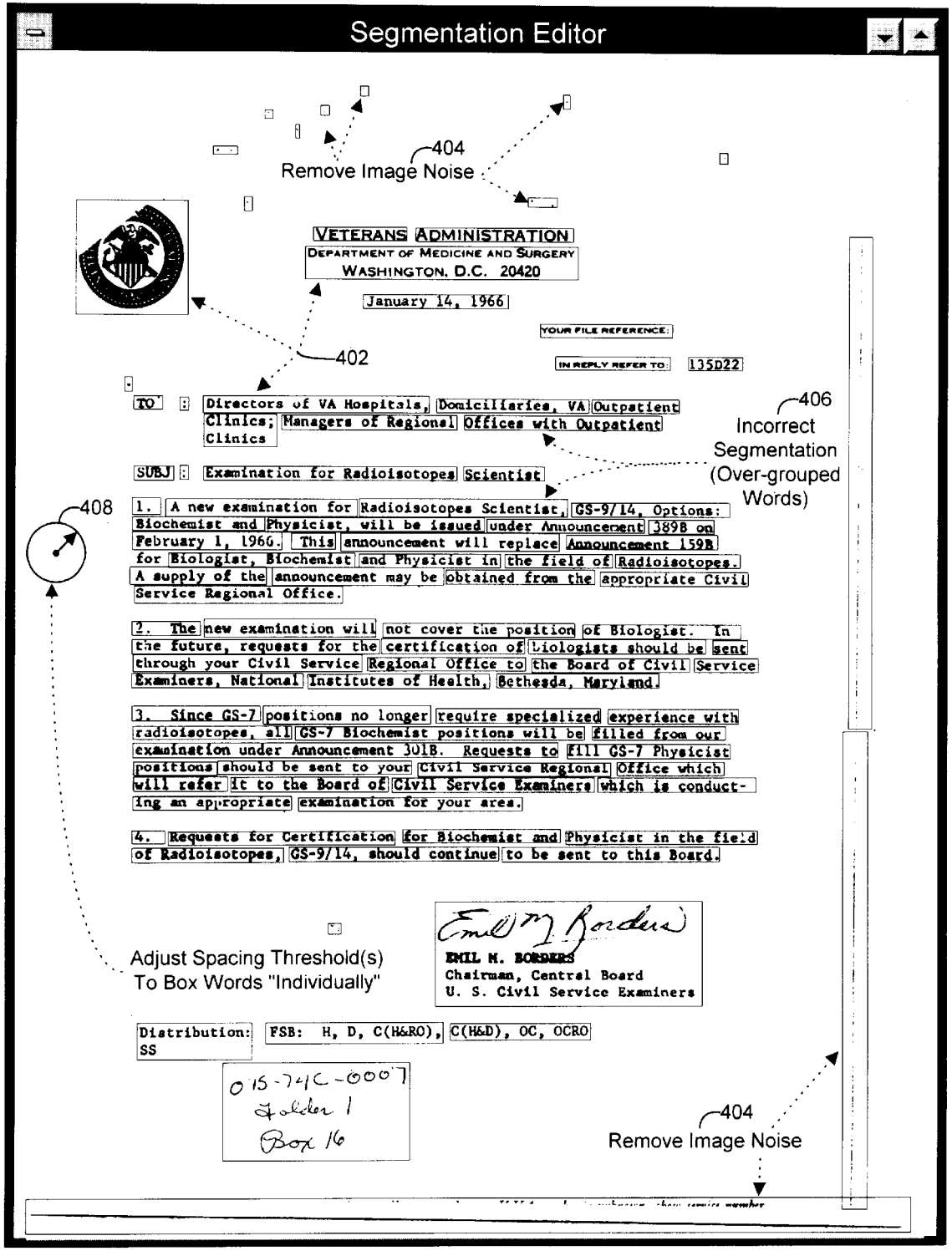
FIG. 4 graphically depicts inaccurate segmentation of an image using bounding boxes, which are displayed directly on the image itself, in accord with an embodiment of the present invention.

FIG. 4 shows a segmentation editor displaying a portion of the document image for which automatic segmentation has been performed. Image objects are presented with rectangular bounding boxes 402. The segmentation editor includes popular image processing tools for noise removal, page deskew, color alteration, etc. Methods for implementing such tools are well known to those skilled in the art. For an example of such tools, see the Adobe® Photoshop® computer software application. Noise objects 404 should be removed prior to index construction so as not to pollute the object subsets. Simple correction of incorrect segmentation of word objects 406 is enabled by interface features that include a user adjustable threshold 408. Said threshold is used to effect parameters as required for bounding box construction by the automatic segmentation algorithm. Alteration of the threshold is followed by re-segmentation and an update of the document image display, thereby permitting interactive fine-tuning of numerous image object boundaries rather than forcing the user to correct said boundaries one by one.

Figure 5:
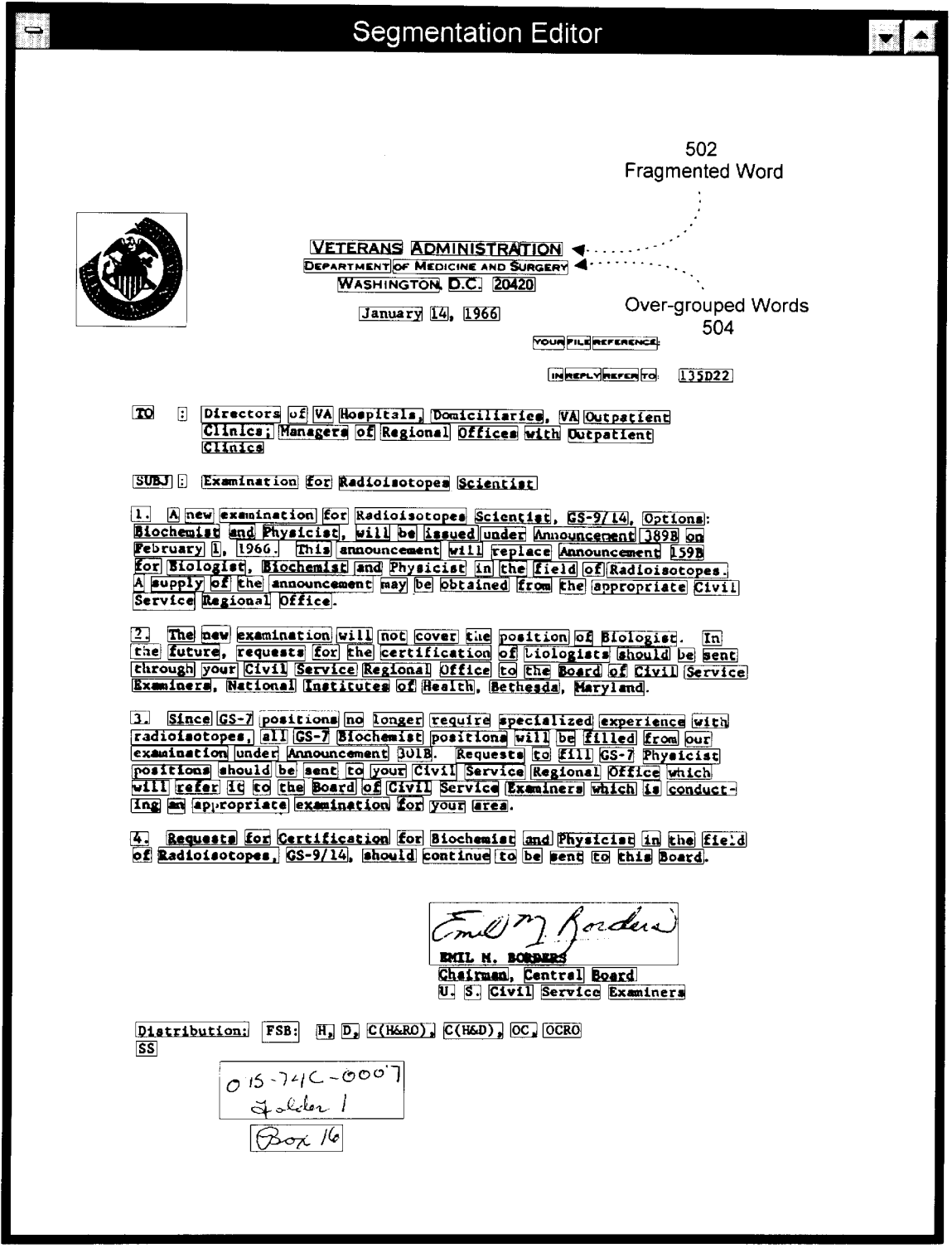
FIG. 5 graphically depicts how human interaction can increase the accuracy of the initial segmentation of an image, in accord with an embodiment of the present invention.

In FIG. 5, the same portion of the document image as shown in FIG. 4 is illustrated as accepted by a user following segmentation review. For purposes of further demonstration, image objects 502 and 504 are deemed approved despite their incorrect boundaries—in practical applications of the present invention, users will likely overlook some image objects such that incorrect boundaries are defined upon construction of the ground-truthing index. Said image objects can still be corrected later by way of the instance and context editors 322.

Figure 6:
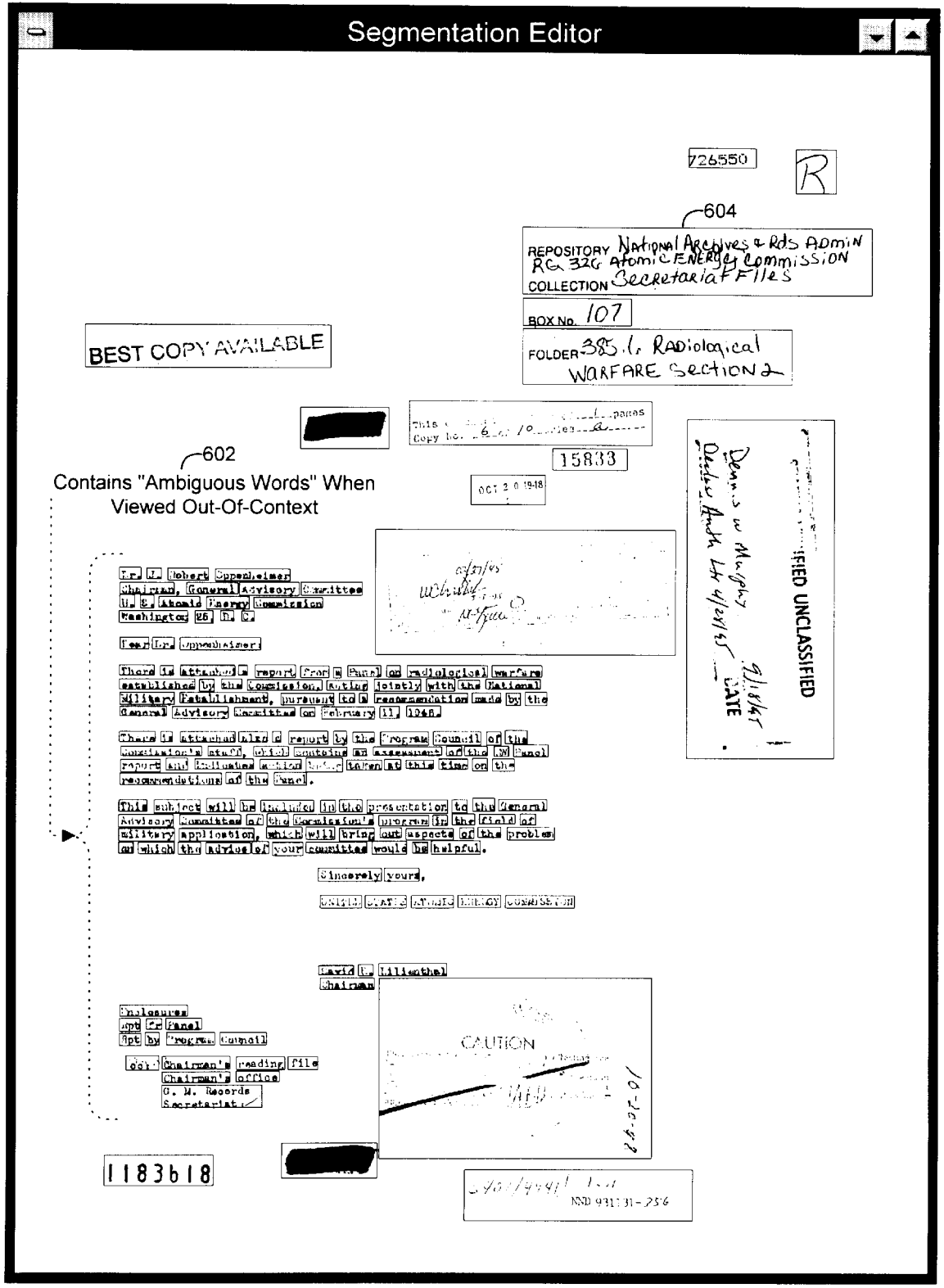
FIG. 6 graphically depicts another image that illustrates how human interaction can increase the accuracy of the initial segmentation of the image, in accord with an embodiment of the present invention.

FIG. 6, shows example image objects that are possibly more efficiently handled if ground-truthed during segmentation review rather than through an index structure. Image objects 602 include many degraded word objects that are easier to identify and hence ground-truth when viewed in context as opposed to in a subset with other similar objects. Image object 604 shows hand-written text that is likely unique within the document image and therefore should be ground-truthed in a document image context rather than within an index subset context.

Figure 7A:
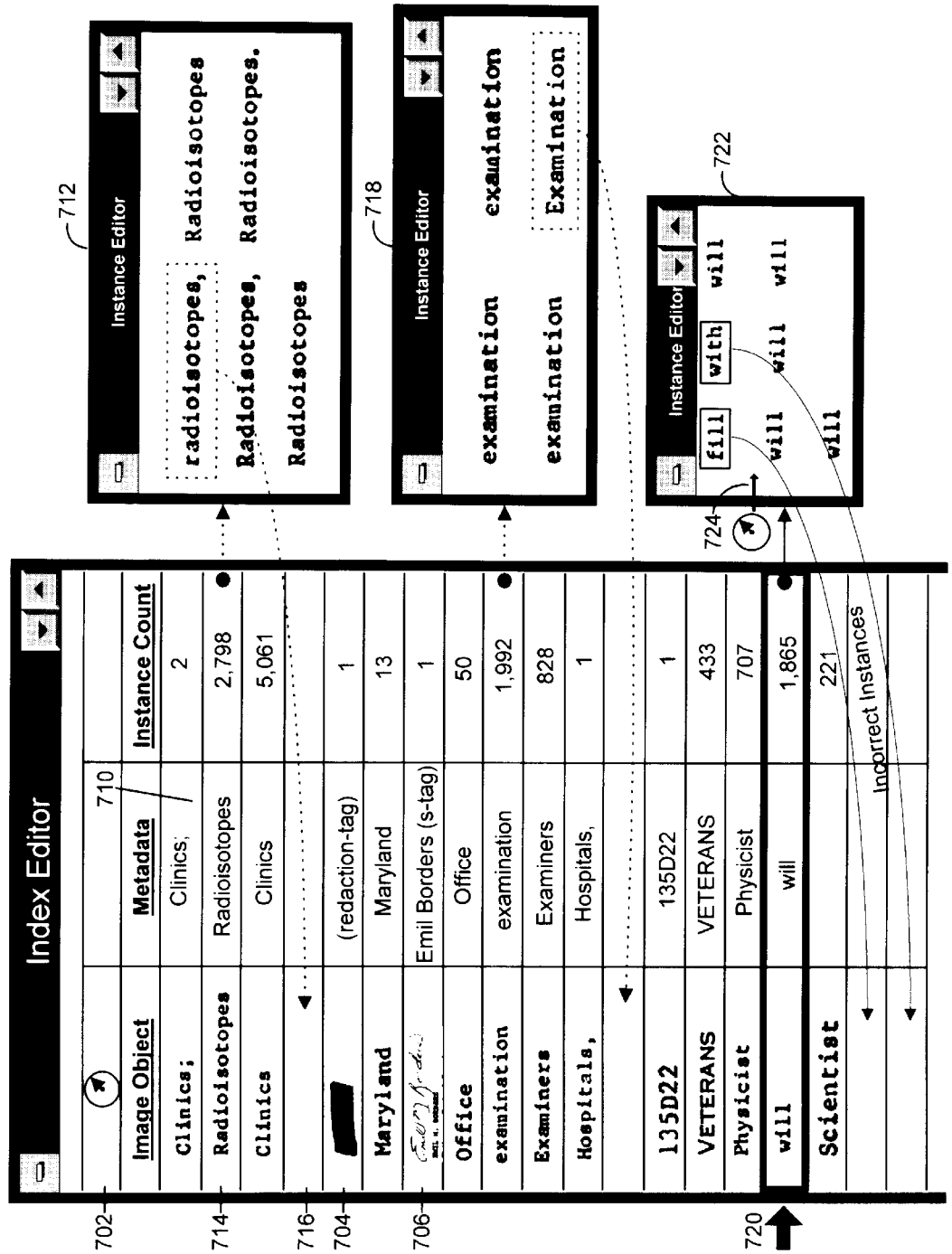
FIGS. 7A and 7B graphically depict an image object pairs index, and associated instance information, used in one embodiment of the invention to ground-truth document images in accord with an embodiment of the present invention.
Figure 7B:
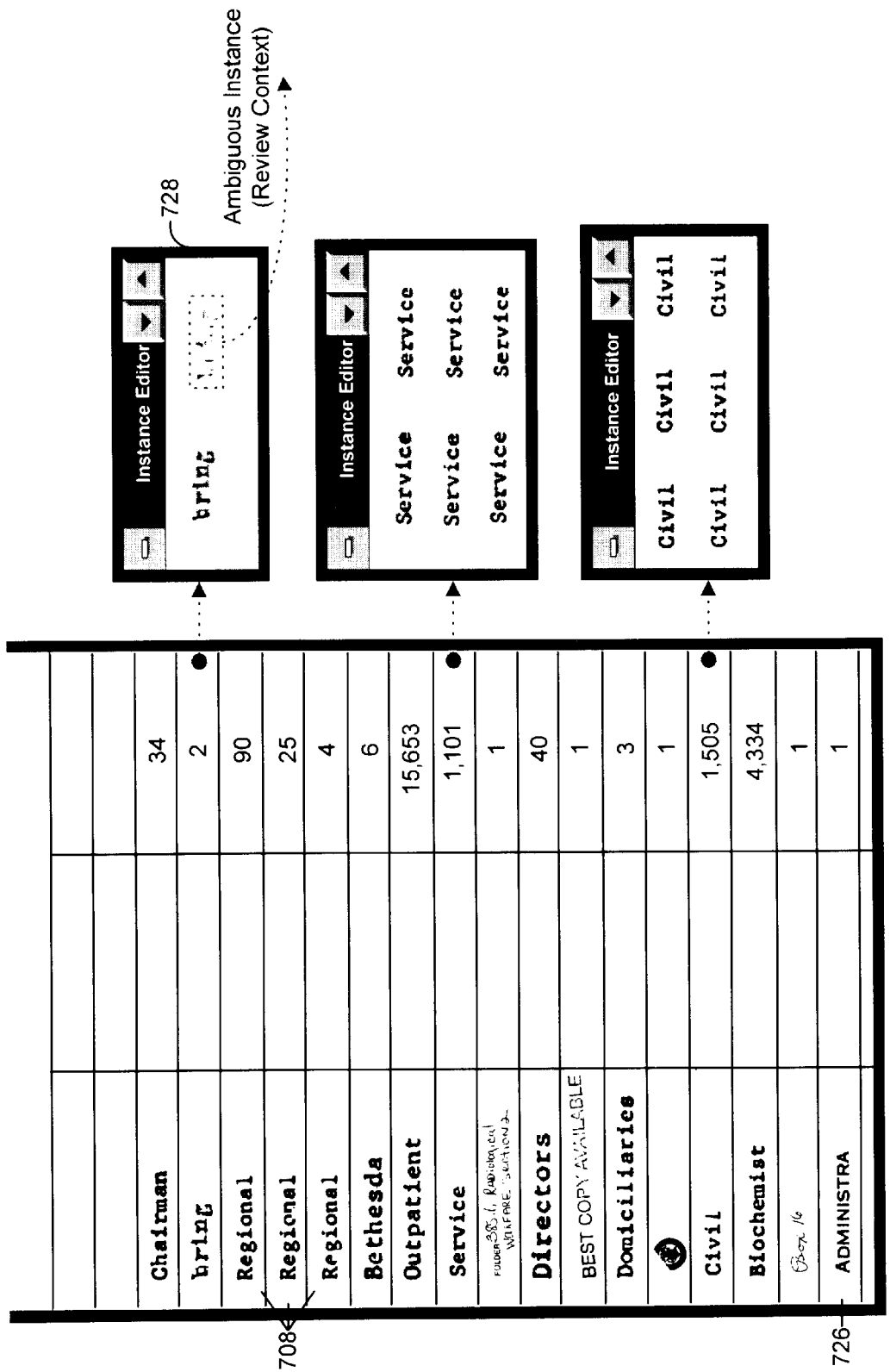

FIGS. 7A and 7B depict example interface elements of an index editor in accordance with one embodiment of the present invention in which no metadata has been proposed e.g., using text recognition, for subsets within the index. Graphical dial 702 is a user adjustable control implementing threshold 110. Redaction tag 704 instructs the index editor to exclude from the index all image object pairs having a redaction tag. As an additional example, an s-tag (i.e. a 'signature' tag) 706 provides additional control information.

The rows in the tabular display 710 may be sorted to aid in human review e.g., sorting on optical shape of the objects, or their metadata fields, or their instance counts within the document image. Typical editing operations supported by the editor include cutting, pasting, merging, sorting, inserting, deleting, and drag-and-dropping entries from one location in the table to another. For example, the three rows 708 can be merged into a single subset containing 119 instance objects.

For enhanced user interaction, configurable visual aids such as color may be used in the display of index subsets e.g., subsets with many instance objects may be colored green to indicate to the user that review and approval of such subsets will ground-truth a greater portion of the document image compared with other subsets holding fewer objects. This will aid a user who is short on time and wishes only to ground-truth more populated subsets. Another example of the application of color would apply to rendering of entries in the table pertaining to uncommon words where said words are identified as being uncommon in the language by way of a dictionary resource and metadata proposed by a text recognition resource. Most search engines ignore common words, so a user wishing to ground-truth a useful subset of the image objects in the database could ignore subsets holding common words. Also, resources such as a dictionary or the database itself may be used to color code subsets whose representative objects are assumed not to match other objects within a specified domain, as said subsets will presumably never contain blatantly incorrect instance objects. For example, the word "radioisotopes" may be flagged a priori as having no significantly similar objects within the English language, either in plain text space or in optical shape space. Such a flag could then be used to indicate, e.g., by color code, that subset 714 will contain at most mild variants of the word "radioisotopes". This may reduce the amount of time the user spends studying a subset for possibly incorrect object entries.

Figure 8:
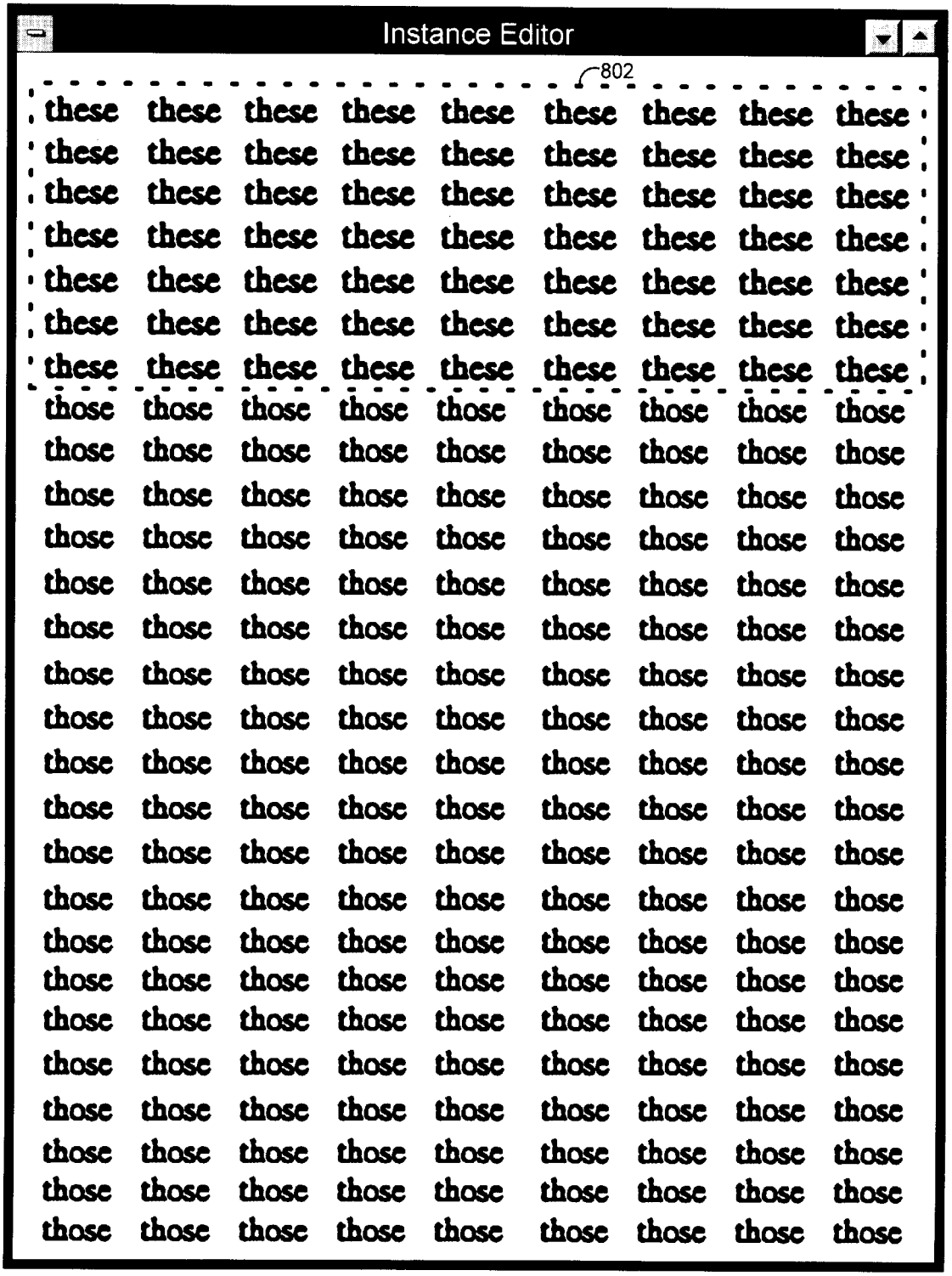
FIG. 8 graphically depicts the ability to make simultaneous corrections within a set of instances, assigned to an image object pair contained within an image object pairs index, in accord with an embodiment of the present invention.

Instance editor 712 displays the image objects in the subset linked to representative object "Radioisotopes" 714. In reviewing a subset of objects, the user has discretion in determining which instances are considered incorrect for a particular subset. For example, if the goal of ground-truthing the document images is for search and retrieval of document images, attributes such as case differences can be ignored, along with leading and trailing punctuation, as well as different language forms (singular/plural, tense, etc.). Action 716 shows the creation of a new index entry by removal of an object instance from subset 714. Action 720 shows the ground-truthing process as having reached that row in the table i.e., all entries below 720 are awaiting metadata. Instance objects of subset 720 are shown in the instance editor 722. Ordering of objects displayed in 722 can be controlled using adjustable threshold 724 e.g., to sort the image objects based on shape such that the most dissimilar shapes relative to the representative object appear closer to the top-left corner of the window frame. This serves to draw the user's attention to any incorrect instances within the subset (in this case, "fill" and "with"). As described earlier, incorrect instances may be moved into other locations within the index or database, either interactively or automatically. As with tabular display 710, visual aids such as color may also be used by the user in locating incorrect instance objects within a subset. For example, objects of very similar shape to the reference object, according to a threshold 724, are colored in a shade of green, whereas more dissimilar objects are given other shades such as orange and red. Also, sorting of displayed instances may be achieved using the same principles as described above for the index table e.g., sorting on metadata fields using metadata proposed by a text recognition resource. Another example is shown in FIG. 8 where the instances of "these" 802 are conveniently displayed separately from the instances of "those" using 'similar shape' sorting, thereby allowing the user to select the objects 802 as a single entity for editing purposes. Moreover, such sorting that displays dissimilar (and likely incorrect) instances higher up the window frame speeds up ground-truthing as the user need only focus attention on the objects displayed in the upper region of the frame—all other objects lower down are presumably correct for the subset in question.

Figure 9:
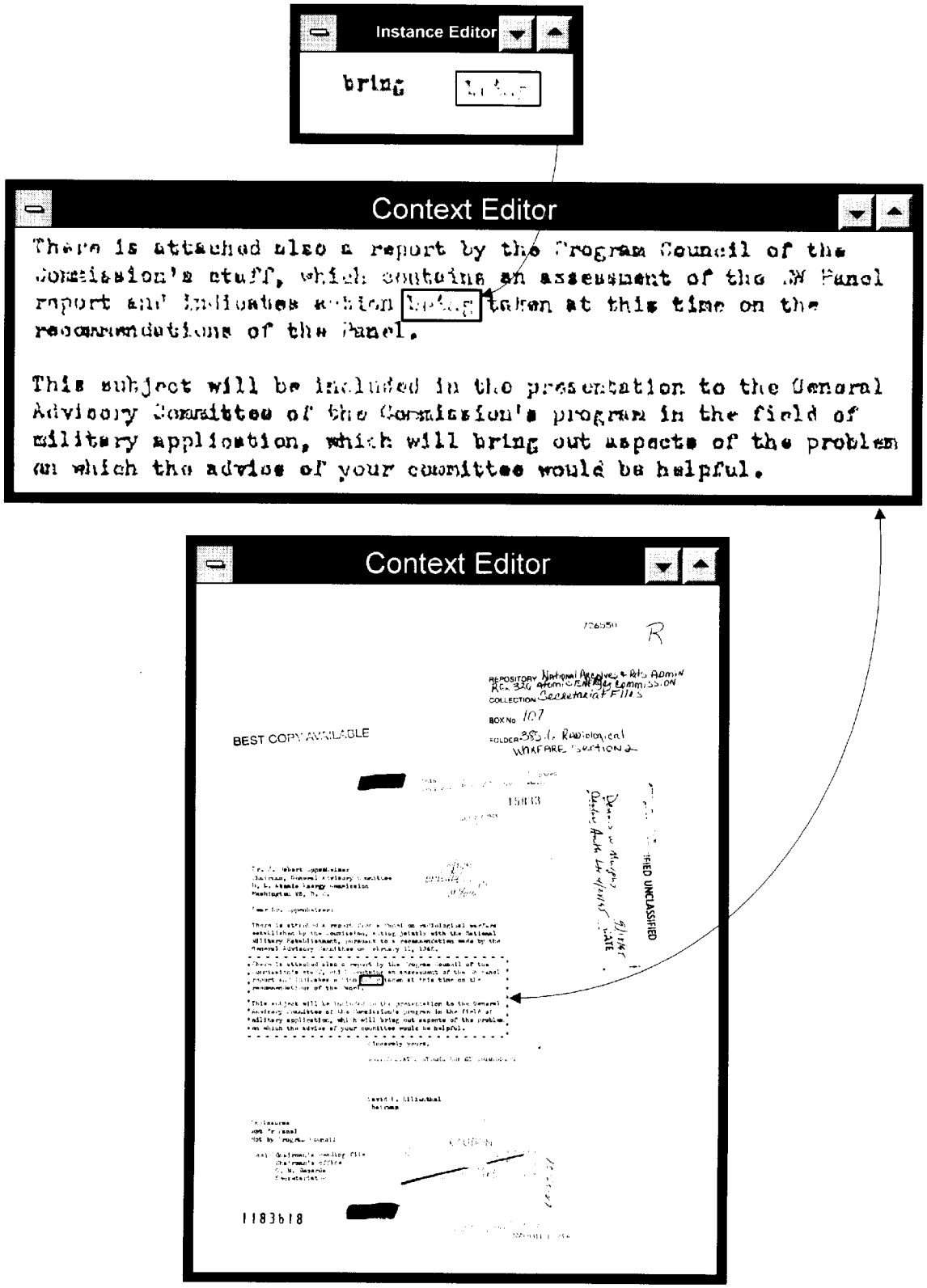
FIG. 9 graphically depicts the context of an ambiguous instance of an image object in the image object index, in accord with an embodiment of the present invention.

As introduced above in FIG. 5, incorrect instance 726 appears in the index, along with an ambiguous instance within subset 728. FIG. 9 therefore shows an example of a context editor in which the ambiguous word is identified and resolved. This not only enables the user to resolve the word "being" but also presents the user with the opportunity to ground-truth much of the text displayed—if there exist image objects therein not already ground-truthed earlier. For example, word objects with linked metadata already approved may be displayed in a particular color scheme. The user then enters metadata for the remaining objects within the paragraph directly, without recourse to the index. In particular, speech recognition supported by reading order links or eye tracking provides a very rapid means for ground-truthing said remaining objects.

A good overview of page segmentation techniques is shown in O. Okun, D. Doermann, and M. Pietikainen. *Page Segmentation and Zone Classification: The State of the Art*. Technical Report: LAMP-TR-036/CAR-TR-927/CS-TR-4079, University of Maryland, College Park, 1999.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for analyzing a document image, comprising:
   segmenting the document image to identify a set of image objects within the document image;
   processing the set to group image objects within the set into a plurality of subsets, the subsets including one or more image objects;
   linking reference image objects to corresponding subsets in the plumlity of subsets;
   creating machine readable data structures pairing the reference image objects with linked metadata fields, whereby image objects in the corresponding subsets are linked to common metadata in the linked metadata fields; and
   presenting the reference image objects to a user, and accepting input from the user, to interactively populate the linked metadata fields with ground-truthed metadata, the metadata including searchable characteristics of the image objects in the corresponding subsets.

2. The method of claim 1, including generating a searchable data structure to represent said document image.

3. The method of claim 1, wherein the segmenting includes:
   presenting at least a portion of the document image with graphical constructs showing boundaries of the identified image objects in the set to a user, and accepting input from the user, to interactively adjust the boundaries to form a new set of identified image objects.

4. The method of claim 1, wherein the searchable characteristics include a computer readable representation of a word within the image object.

5. The method of claim 1, including accepting input from a plurality of users, to interactively populate the linked metadata fields with ground-truthed metadata.

6. The method of claim 1, wherein said presenting the reference image objects to the user includes ordering the reference image objects in said presentation.

7. The method of claim 6, wherein said ordering is based on shapes of the reference image objects.

8. The method of claim 6, wherein said ordering is based on the metadata linked to the reference image objects.

9. The method of claim 1, wherein said presenting the reference image objects to the user includes one or more reference image objects with ground-truthed metadata in the linked metadata fields.

10. The method of claim 1, wherein presenting the reference image objects to a user, and accepting input from the user, to interactively populate the linked metadata fields with ground-truthed metadata, includes accepting audio input and translating the audio input using speech recognition tools.

11. The method of claim 1, wherein presenting the reference image objects to a user, and accepting input from the user, to interactively populate the linked metadata fields with ground-truthed metadata, includes accepting input to change the ground-truthed metadata.

12. The method of claim 1, wherein the processing groups image objects in the set according to characteristics suggesting that the image objects in a particular subset may have common ground-truthed metadata.

13. The method of claim 1, wherein the processing groups image objects in the set according to characteristics suggesting that the image objects in a particular subset consists of image objects having similar shapes.

14. The method of claim 1, wherein the processing groups image objects in the set according to characteristics suggesting that the image objects in a particular subset consists of image objects having similar shapes according to an adjustable parameter.

15. The method of claim 1, wherein the presenting includes displaying a table having a set of entries, entries in the table corresponding to the subsets of image objects within the set, the entries including the representative image objects for the respective subsets, and fields for the common ground-truthed metadata.

16. The method of claim 1, including displaying instances of image objects within a selected subset, and accepting user input to interactively remove an image object from the selected subset.

17. The method of claim 1, including displaying instances of image objects within a selected subset, and accepting user input to interactively move an image object from the selected subset into another subset.

18. The method of claim 1, wherein the reference image object consists of an image object from the corresponding subset.

19. The method of claim 1, wherein the reference image object consists of an image object constructed in response to two or more image objects from the corresponding subset.

20. The method of claim 1, wherein the reference image object consists of an image object constructed in response to two or more image objects from the set of image objects.

21. The method of claim 1, wherein the document image comprises a machine readable file including a bit mapped representation of a document.

22. The method of claim 1, wherein the document image comprises a plurality of machine readable files including respective bit mapped representations documents.

23. A method for analyzing a document image, comprising:

segmenting the document image to identify a set of image objects within the document image;

creating machine readable data structures pairing the identified image objects in the set with linked metadata fields; and presenting representations of the identified image objects to a user, and accepting audio input translated with speech recognition tools to interactively populate the linked metadata fields with ground-truthed metadata, the metadata including searchable characteristics of the image objects to which the respective metadata fields are linked.

24. The method of claim 23, including generating a searchable data structure to represent said document image.

25. The method of claim 23, wherein the segmenting includes:

presenting at least a portion of the document image with graphical constructs showing boundaries of the identified image objects in the set to a user, and accepting input from the user, to interactively adjust the boundaries to form a new set of identified image objects.

26. The method of claim 23, wherein the document image comprises a machine readable file including a bit mapped representation of a document.

27. The method of claim 23, wherein the document image comprises a plurality of machine readable files including respective bit mapped representations document.

28. The method of claim 23, wherein presenting representations of the image objects includes presenting the representations in reading order with respect to the document image.

29. The method of claim 23, wherein presenting representations of the image objects includes presenting the representations in an index grouping similar image objects.

30. The method of claim 23, including processing said set of image objects to find candidate image objects in response to text derived from the audio input translated with speech recognition tools, and populating the linked metadata fields of the candidate image objects with the text.

31. The method of claim 23, wherein said presenting representations of the identified image objects to the user includes ordering the representations of the identified image objects in said presentation.

32. The method of claim 31, wherein said ordering is based on shapes of the identified image objects.

33. The method of claim 31, wherein said ordering is based on the metadata linked to the identified image objects.

34. The method of claim 23, wherein said presenting representations of the identified image objects to the user includes one or more identified image objects with ground-truthed metadata in the linked metadata fields.

35. The method of claim 23, wherein the presenting representations of the identified image objects includes presenting the representations in a reading order for the document image.

36. A method for analyzing a document image, comprising:

segmenting the document image to identify a set of image objects within the document image;

applying text recognition tools to produce proposed text for the set of image objects;

processing the set to group image objects with the set into a plurality of subsets, the subsets including one or more image objects;

linking reference image objects to corresponding subsets in the plurality of subsets;

creating machine readable data structures pairing the reference image objects with linked metadata fields, whereby image objects in the corresponding subsets are linked to common metadata in the linked metadata fields, and populating the linked metadata fields based on the proposed text; and presenting the reference image objects to a user, and accepting input from the user, to interactively populate the linked metadata fields with ground-truthed metadata, the metadata including searchable characteristics of the image objects in the corresponding subsets, including accepting input to verify and to edit the proposed text to establish the ground-truthed metadata.

37. The method of claim 36, including generating a searchable data structure to represent said document image.

38. The method of claim 36, wherein the segmenting includes:

presenting at least a portion of the document image with graphical constructs showing boundaries of the identified image objects in the set to a user, and accepting input from the user, to interactively adjust the boundaries to form a new set of identified image objects.

39. The method of claim 36, wherein the searchable characteristics include a computer readable representation of a word within the image object.

40. The method of claim 36, wherein presenting the reference image objects to a user, and accepting input from the user, to interactively populate the linked metadata fields with ground-truthed metadata, includes accepting audio input and translating the audio input using speech recognition tools.

41. The method of claim 36, presenting the reference image objects to a user, and accepting input from the user, to interactively populate the linked metadata fields with ground-truthed metadata, includes accepting input to change the ground-truthed metadata.

42. The method of claim 36, wherein the processing groups image objects in the set according to characteristics suggesting that the image objects in a particular subset may have common ground-truthed metadata.

43. The method of claim 36, wherein the processing groups image objects in the set according to characteristics suggesting that the image objects in a particular subset consists of image objects having similar shapes.

44. The method of claim 36, wherein the processing groups image objects in the set according to characteristics suggesting that the image objects in a particular subset consists of image objects having similar shapes according to an adjustable parameter.

45. The method of claim 36, wherein the presenting the index includes displaying a table having a set of entries, entries in the table corresponding to the subsets of image objects within the set, the entries including the representative image objects for the respective subsets, and fields for the common ground-truthed metadata.

46. The method of claim 36, including displaying instances of image objects within a selected subset, and accepting user input to interactively remove an image object from the selected subset.

47. The method of claim 36, including displaying instances of image objects within a selected subset, and accepting user input to interactively move an image object from the selected subset into another subset.

48. The method of claim 36, wherein the reference image object consists of an image object from the corresponding subset.

49. The method of claim 36, wherein the reference image object consists of an image object constructed in response to two or more image objects from the corresponding subset.

50. The method of claim 36, wherein the reference image object consists of an image object constructed in response to two or more image objects from the corresponding set of image objects.

51. The method of claim 36, wherein the document image comprises a machine readable file including a bit mapped representation of a document.

52. The method of claim 36, wherein the document image comprises a plurality of machine readable files including respective bit mapped representations documents.

53. The method of claim 36, wherein the applying text recognition tools includes applying text recognition tools to the image objects individually.

54. The method of claim 36, wherein the applying text recognition tools includes applying text recognition tools to the reference image objects.

55. The method of claim 36, wherein the applying text recognition tools includes applying contextual text recognition tools.

56. The method of claim 36, wherein the populating the linked metadata fields includes selecting proposed text for the linked metadata field based upon the proposed text for members of the corresponding subset.

57. The method of claim 36, including accepting input from a plurality of users, to interactively populate the linked metadata fields with ground-truthed metadata.

58. The method of claim 36, wherein said presenting the reference image objects to the user includes ordering the reference image objects in said presentation.

59. The method of claim 58, wherein said ordering is based on shapes of the reference image objects.

60. The method of claim 58, wherein said ordering is based on the metadata linked to the reference image objects.

61. The method of claim 36, wherein said presenting the reference image objects to the user includes one or more reference image objects with ground-truthed metadata in the linked metadata fields.

62. A method for analyzing a document image, comprising:

providing a database of representative image objects with linked metadata fields storing metadata, the metadata including searchable characteristics of image objects matching the representative image objects;

segmenting the document image to identify a set of image objects within the document image;

processing the set to match image objects in the set with representative image objects in the database, and to link matching image objects in the set with particular representative image objects in the database; and displaying instances of image objects in the set that are linked with a particular representative image object in the database, and accepting user input to interactively undo the link of selected image objects with the particular representative image object.

63. The method of claim 62, including generating a searchable data structure to represent said document image.

64. The method of claim 62, including accepting user input to interactively change the link of a selected image object with the particular representative image object to a link with another representative image object in the database.

65. The method of claim 62, wherein the segmenting includes:
presenting at least a portion of the document image with graphical constructs showing boundaries of the identified image objects in the set to a user, and accepting input from the user, to interactively adjust the boundaries to form a new set of identified image objects.

66. The method of claim 62, wherein the searchable characteristics include a computer readable representation of a word within the image object.

67. The method of claim 62, including
creating machine readable data structures pairing particular image objects in the set, not linked to representative image objects, with linked metadata fields; and
presenting representations of the particular image objects to a user, and accepting input to interactively populate the linked metadata fields with ground-truthed metadata, the metadata including searchable characteristics of the image objects to which the respective metadata fields are linked.

68. The method of claim 62, including
creating machine readable data structures pairing a selected image object in the set with a linked metadata field; and
establishing an entry in the database for the selected image object.

69. The method of claim 62, wherein said accepting user input includes accepting user input from a plurality of users.

70. An apparatus, comprising:
a data processing system including a user input device, a display, one of memory, or access to memory, storing a document image, and resources for processing the document image, the resources including logic to:
segment the document image to identify a set of image objects within the document image;
process the set to group image objects within the set into a plurality of subsets, the subsets including one or more image objects;
link reference image objects to corresponding subsets in the plurality of subsets;
store data structures pairing the reference image objects with linked metadata fields, whereby image objects in the corresponding subsets are linked to common metadata in the linked metadata fields; and
present the reference image objects to a user on the display, and accept input from the user via the user input device, to interactively populate the linked metadata fields with ground-truthed metadata, the metadata including searchable characteristics of the image objects in the corresponding subsets.

71. The apparatus of claim 70, the data processing resources including logic to generate a searchable data structure to represent said document image.

72. The apparatus of claim 70, wherein the logic to segment includes logic to:
present at least a portion of the document image on the display with graphical constructs showing boundaries of the identified image objects in the set to a user, and accepting input from the user, to interactively adjust the boundaries to form a new set of identified image objects.

73. The apparatus of claim 70, wherein the searchable characteristics include a computer readable representation of a word within the image object.

74. The apparatus of claim 70, including resources to accept input via a communication medium from a plurality of users, to interactively populate the linked metadata fields with ground-truthed metadata.

75. The apparatus of claim 70, wherein said logic to present the reference image objects to the user includes logic to order the reference image objects in said presentation.

76. The apparatus of claim 70, wherein said logic to present the reference image objects to the user includes logic to order the reference image objects in said presentation based on shapes of the reference image objects.

77. The apparatus of claim 70, wherein said logic to present the reference image objects to the user includes logic to order the reference image objects in said presentation based on the metadata linked to the reference image objects.

78. The apparatus of claim 70, wherein said logic to present the reference image objects to the user presents one or more reference image objects with ground-truthed metadata in the linked metadata fields.

79. The apparatus of claim 70, wherein said user input device includes resources accepting audio input and translating the audio input using speech recognition tools.

80. The apparatus of claim 70, including resources accepting input to change the ground-truthed metadata.

81. The apparatus of claim 70, wherein the logic to process includes logic that groups image objects in the set according to characteristics suggesting that the image objects in a particular subset may have common ground-truthed metadata.

82. The apparatus of claim 70, wherein the logic to process includes logic that groups image objects in the set according to characteristics suggesting that the image objects in a particular subset consists of image objects having similar shapes.

83. The apparatus of claim 70, wherein the logic to process includes logic that groups image objects in the set according to characteristics suggesting that the image objects in a particular subset consists of image objects having similar shapes according to an adjustable parameter.

84. The apparatus of claim 70, including logic to display a table having a set of entries, entries in the table corresponding to the subsets of image objects within the set, the entries including the representative image objects for the respective subsets, and fields for the common ground-truthed metadata.

85. The apparatus of claim 70, including logic to display instances of image objects within a selected subset, and accepting user input to interactively remove an image object from the selected subset.

86. The apparatus of claim 70, including logic to display instances of image objects within a selected subset, and accepting user input to interactively move an image object from the selected subset into another subset.

87. The apparatus of claim 70, wherein the reference image object consists of an image object from the corresponding subset.

88. The apparatus of claim 70, wherein the reference image object consists of an image object constructed in response to two or more image objects from the corresponding subset.

89. The apparatus of claim 70, wherein the reference image object consists of an image object constructed in response to two or more image objects from the set of image objects.

90. The apparatus of claim 70, wherein the document image comprises a machine readable file including a bit mapped representation of a document.

91. The apparatus of claim 70, wherein the document image comprises a plurality of machine readable files including respective bit mapped representations documents.

92. An apparatus for analyzing a document image, comprising:
a data processing system including a user input device, a display, one of memory, or access to memory, storing a document image, and resources for processing the document image, the resources including logic to:
segment the document image to identify a set of image objects within the document image;
create and store machine readable data structures pairing the identified image objects in the set with linked metadata fields; and
present representations of the identified image objects to a user, and accepting audio input translated with speech recognition tools to interactively populate the linked metadata fields with ground-truthed metadata, the metadata including searchable characteristics of the image objects to which the respective metadata fields are linked.

93. The apparatus of claim 92, including logic to generate a searchable data structure to represent said document image.

94. The apparatus of claim 92, wherein the logic to segment presents at least a portion of the document image with graphical constructs showing boundaries of the identified image objects in the set to a user, and accepts input from the user, to interactively adjust the boundaries to form a new set of identified image objects.

95. The apparatus of claim 92, wherein the document image comprises a machine readable file including a bit mapped representation of a document.

96. The apparatus of claim 92, wherein the document image comprises a plurality of machine readable files including respective bit mapped representations documents.

97. The apparatus of claim 92, wherein logic to present representations of the image objects presents the representations in reading order with respect to the document image.

98. The apparatus of claim 92, wherein logic to present representations of the image objects presents the representations in an index grouping similar image objects.

99. The apparatus of claim 92, including logic to process said set of image objects to find candidate image objects in response to text derived from the audio input translated with speech recognition tools, and to populate the linked metadata fields of the candidate image objects with the text.

100. The apparatus of claim 92, wherein said logic to present representations of the identified image objects to the user orders the representations of the identified image objects in said presentation.

101. The apparatus of claim 100, wherein said ordering is based on shapes of the identified image objects.

102. The apparatus of claim 100, wherein said ordering is based on the metadata linked to the identified image objects.

103. The apparatus of claim 92, wherein said logic to present representations of the identified image objects to the user presents one or more identified image objects with ground-truthed metadata in the linked metadata fields.

104. The apparatus of claim 92, wherein the logic to present representations of the identified image objects presents the representations in a reading order for the document image.

105. An apparatus, comprising:
a data processing system including a user input device, a display, one of memory, or access to memory, storing a document image, and resources for processing the document image, the resources including logic to:
segment the document image to identify a set of image objects within the document image;
apply text recognition tools to produce proposed text for the set of image objects;
process the set to group image objects with the set into a plurality of subsets, the subsets including one or more image objects;
link reference image objects to corresponding subsets in the plurality of subsets;
create and store machine readable data structures pairing the reference image objects with linked metadata fields, whereby image objects in the corresponding subsets are linked to common metadata in the linked metadata fields, and populating the linked metadata fields based on the proposed text; and
present the reference image objects to a user, and accept input from the user, to interactively populate the linked metadata fields with ground-truthed metadata, the metadata including searchable characteristics of the image objects in the corresponding subsets, including logic to accept input to verify and to edit the proposed text to establish the ground-truthed metadata.

106. The apparatus of claim 105, including logic to generate a searchable data structure to represent said document image.

107. The apparatus of claim 105, wherein the logic to segment includes logic that:
presents at least a portion of the document image with graphical constructs showing boundaries of the identified image objects in the set to a user, and accepts input from the user, to interactively adjust the boundaries to form a new set of identified image objects.

108. The apparatus of claim 105, wherein the searchable characteristics include a computer readable representation of a word within the image object.

109. The apparatus of claim 105, wherein Logic to present the reference image objects to a user, and accept input from the user, to interactively populate the linked metadata fields with ground-truthed metadata, accepts audio input and translates the audio input using speech recognition tools.

110. The apparatus of claim 105, including the logic to present the reference image objects to a user, and accept input from the user, to interactively populate the linked metadata fields with ground-truthed metadata, accepts input to change the ground-truthed metadata.

111. The apparatus of claim 105, wherein the logic to process groups image objects in the set according to characteristics suggesting that the image objects in a particular subset may have common ground-truthed metadata.

112. The apparatus of claim 105, wherein the logic to process groups image objects in the set according to characteristics suggesting that the image objects in a particular subset consists of image objects having similar shapes.

113. The apparatus of claim 105, wherein the logic to process groups image objects in the set according to characteristics suggesting that the image objects in a particular subset consists of image objects having similar shapes according to an adjustable parameter.

114. The apparatus of claim 105, wherein the logic to present the index displays a table having a set of entries, entries in the table corresponding to the subsets of image objects within the set, the entries including the representative image objects for the respective subsets, and fields for the common ground-truthed metadata.

115. The apparatus of claim 105, including logic to display instances of image objects within a selected subset, and accept user input to interactively remove an image object from the selected subset.

116. The apparatus of claim 105, including logic to display instances of image objects within a selected subset, and accept user input to interactively move an image object from the selected subset into another subset.

117. The apparatus of claim 105, wherein the reference image object consists of an image object from the corresponding subset.

118. The apparatus of claim 105, wherein the reference image object consists of an image object constructed in response to two or more image objects from the corresponding subset.

119. The apparatus of claim 105, wherein the reference image object consists of an image object constructed in response to two or more image objects from the corresponding set of image objects.

120. The apparatus of claim 105, wherein the document image comprises a machine readable file including a bit mapped representation of a document.

121. The apparatus of claim 105, wherein the document image comprises a plurality of machine readable files including respective bit mapped representations documents.

122. The apparatus of claim 105, wherein the logic to apply text recognition tools applies text recognition tools to the image objects individually.

123. The apparatus of claim 105, wherein the logic to apply text recognition tools applies text recognition tools to the reference image objects.

124. The apparatus of claim 105, wherein the logic to apply text recognition tools applies contextual text recognition tools.

125. The apparatus of claim 105, wherein the logic to populate the linked metadata fields selects proposed text for the linked metadata field based upon the proposed text for members of the corresponding subset.

126. The apparatus of claim 105, including logic to accept input from a plurality of users, to interactively populate the linked metadata fields with ground-truthed metadata.

127. The apparatus of claim 105, wherein said logic to present the reference image objects to the user orders the reference image objects in said presentation.

128. The apparatus of claim 127, wherein said ordering is based on shapes of the reference image objects.

129. The apparatus of claim 127, wherein said ordering is based on the metadata linked to the reference image objects.

130. The apparatus of claim 105, wherein said logic to present the reference image objects to the user includes one or more reference image objects with ground-truthed metadata in the linked metadata fields.

131. An apparatus for analyzing a document image, comprising:

a data processing system including a user input device, a display, one of memory, or access to memory, storing a document image, and resources for processing the document image, the resources including logic to:

access a database of representative image objects with linked meradata fields storing metadata, the metadata including searchable characteristics of image objects matching the representative image objects;

segment the document image to identify a set of image objects within the document image;

process the set to match image objects in the set with representative image objects in the database, and to link matching image objects in the set with particular representative image P objects in the database; and display instances of image objects in the set that are linked with a particular representative image object in the database, and accept user input to interactively undo the link of selected image objects with the particular representative image object.

132. The apparatus of claim 131, including logic to generate and store a searchable data structure to represent said document image.

133. The apparatus of claim 131, including logic to accept user input to interactively change the link of a selected image object with the particular representative image object to a link with another representative image object in the database.

134. The apparatus of claim 131, wherein the logic to segment includes logic that:

presents at least a portion of the document image with graphical constructs showing boundaries of the identified image objects in the set to a user, and accepts input from the user, to interactively adjust the boundaries to form a new set of identified image objects.

135. The apparatus of claim 131, wherein the searchable characteristics include a computer readable representation of a word within the image object.

136. The apparatus of claim 131, including logic to create machine readable data structures pairing particular image objects in the set, not linked to representative image objects, with linked metadata fields; and present representations of the particular image objects to a user, and accept input to interactively populate the linked metadata fields with ground-truthed metadata, the metadata including searchable characteristics of the image objects to which the respective metadata fields are linked.

137. The apparatus of claim 131, including logic to create machine readable data structures pairing a selected image object in the set with a linked metadata field; and establish an entry in the database for the selected image object.

138. The apparatus of claim 131, wherein said logic to accept user input accepts user input from a plurality of users.

* * * * *